Patented Nov. 17, 1936

2,061,018

UNITED STATES PATENT OFFICE 2,061,018

HYDROGEN POLYSULPHIDE ADDITION PRODUCTS OF UNSATURATED ALIPHATIC HYDROCARBONS AND PROCESS OF PRODUCING THEM

Wallace H. Carothers, Arden, Del., assignor to E. I. du Pont de Nemours & Company, Wilmington, Del., a corporation of Delaware No Drawing. Application April 18, 1934, Serial No. 721,151

25 Claims. (Cl. 260—16)

This invention relates to the formation of addition compounds by treating unsaturated organic compounds with hydrogen polysulphides or mixtures of hydrogen polysulphides. More particularly it relates to the preparation of hydrogen polysulphide addition products of non-aromatic liquid polymers of acetylene. Still more particularly it relates to the preparation of polysulphide addition products of divinylacetylene.

It is an object of this invention to produce new and useful products by reacting non-aromatic liquid polymers of acetylene with hydrogen polysulphides. A further object of the invention is to react hydrogen polysulphides with divinylacetylene. A still further object of the invention is to describe the preparation of useful products from these sulphide addition compounds. Other objects will appear hereinafter.

It has now been found that hydrogen polysulphides react very smoothly with highly unsaturated hydrocarbons, particularly the non-aromatic liquid polymers of acetylene, such, for example, as divinylacetylene, with the formation of resinous products which are useful in compositions of film-forming materials. The reaction occurs under a great variety of conditions and the nature and properties of the product are capable of very wide modification, depending on the conditions under which the reaction occurs.

The nature of the present invention is more clearly set forth in the following examples which are intended to be construed as illustrative only.

Example 1

Equal volumes of divinylacetylene and hydrogen polysulphide were mixed and allowed to stand at room temperature. Reaction occurred rapidly with the evolution of considerable heat and the mixture was converted to a yellow resinous mass, most of which was soluble in aromatic hydrocarbons. The reaction product was found to be useful as a film forming material.

Example 2

An excess of hydrogen polysulphide was added to pure divinylacetylene, dissolved in twice its weight of benzene. The reaction occurred rapidly with the evolution of considerable heat and an insoluble product was precipitated after several minutes.

Example 3

10 parts by weight of hydrogen polysulphide having a composition of $H_2S_5$ were added to 20 parts of divinylacetylene, dissolved in 70 parts of benzene. Nitrogen was slowly bubbled through the reaction mixture for 60 hours to remove any liberated hydrogen sulphide. Analysis of the effluent gas showed evolution of only 0.75% of the available hydrogen sulphide. The benzene and excess divinylacetylene were removed under reduced pressure, leaving a residue consisting of 17.2 parts of a pale yellow syrup having the composition $(C_6H_{7.2})_2S_{5.4}$. The product was soluble in aromatic hydrocarbons. Films made from a 33% toluene solution dried in 5 hours (tack free) to form smooth, glossy, hard finishes. The dried films were very resistant to all organic solvents and dilute acids and alkalines.

Example 4

A solution of sodium polysulphide was prepared by adding 413 parts by weight of sodium sulphide ($Na_2S \cdot 9.2H_2O$) and 154 parts of sulphur to 332 parts of water and heated for 3 hours on a steam bath. The resulting sodium polysulphide had the composition $Na_2S_{3.8}$.

The above solution was cooled and added during 1.5 hours to a vigorously stirred solution composed of 312 parts of divinylacetylene, 792 parts of concentrated hydrochloric acid, 660 parts of ice and 1 part of cetyl hydrogen sulphate. The mixture was kept at 0° C. to —5° C. and stirred for 20 minutes after the addition was completed. While raising the temperature to 20° C., it was stirred for an additional 50 minutes. The layer containing the product in divinylacetylene solution was separated, washed and dried. 130 parts of divinylacetylene were recovered by vacuum distillation, leaving 268 parts of the polysulphide addition product, having the composition $$[(C_6H_8)_2S_{3.8}]x$$

and the following properties:

$$d_4^{20} 1.34$$

$$n_D^{20} 1.73$$

molecular weight 414. The compound was a reddish-yellow syrup soluble in ordinary aromatic hydrocarbons, such as benzene, toluene, xylene, etc. The stability of solutions of the product in these solvents was not great and after several days standing precipitation set in. In Examples 6 and 7 a treatment is described to improve stability. Films made from a freshly prepared solution of the product dried in 24 hours (tack free) to smooth, glossy, hard finishes, insoluble in organic solvents and very resistant to dilute acids and alkalies.

Example 5

A sodium polysulphide solution of the composition $Na_2S_2$ was prepared by heating 488 parts by weight of sodium sulphide ($Na_2S\cdot 9.2H_2O$), 64 parts of sulphide and 200 parts of water. This solution was cooled and added slowly, during 1.5 hours to a vigorously stirred mixture composed of 270 parts of divinylacetylene, 800 parts of concentrated hydrochloric acid and 800 parts of ice. The mixture was maintained at 0° C. to —5° C. and stirring was continued for 20 minutes after the addition was completed. The mixture was then stirred for 30 minutes at about 27° C.

On separation of the products 160 parts of divinylacetylene was recovered and 140 parts of polysulphide addition product was obtained, having the composition $$(C_6H_{7.3})_2S_{5.8}$$

and the properties:

$$d_4^{20}\ 1.30$$
$$n_D^{20}\ 1.69$$

molecular weight 424. The reddish, yellow syrup was soluble in aromatic hydrocarbons and most organic solvents. Films prepared from a toluene solution containing 40% by weight of the polysulphide dried in 20 hours (tack free) to give pale yellow, transparent, hard, glossy finishes, insoluble in organic solvents and very resistant to dilute acids and alkalies. Solutions of the product were more stable than those of Example 4, due to the lower sulphur content. Greater stability may be obtained by the methods described in Examples 6 and 7.

Example 6

A solution of sodium polysulphide ($Na_2S_2$) was prepared by heating 733 parts by weight of sodium sulphide ($Na_2S\cdot 9.2H_2O$), 96 parts of sulphur and 750 parts of water. This solution was cooled and added during 1.5 hours to a vigorously stirred mixture composed of 468 parts of divinylacetylene, 665 parts of concentrated hydrochloric acid and 500 parts of ice. The mixture was maintained at 0° C. to —5° C. and stirring continued for 15 minutes after the addition was completed. The temperature was then raised to 20° C. and the solution was allowed to stand for 20 minutes. The layer consisting of polysulphide addition product (365 parts) dissolved in the excess divinylacetylene (201 parts) was separated, washed and dried. The excess divinylacetylene was removed from a small portion of the solution and a reddish, yellow syrup was obtained, similar to the product of Examples 4 and 5. Films from a toluene solution required 20 hours to dry (tack free). The toluene solution itself showed precipitation in four days.

The remainder of the solution of polysulphide addition product in divinylacetylene was heated in an atmosphere of carbon dioxide (to exclude oxygen) for 3.5 hours at 76–78° C., after which the divinylacetylene was removed by vacuum distillation. The remaining polysulphide addition product was a reddish, brown, sticky resin which was very soluble in aromatic hydrocarbons and many organic solvents, for example, butyl acetate, carbon disulphide, carbon tetrachloride, chloroform and dichloroethane. It was not soluble in acetone or alcohol. Analysis indicated the composition to be $(C_6H_{6.7})_2S_{3.4}$. Films prepared from a 50% toluene solution dried (tack free) in 3 to 4 hours, and were hard, smooth, glossy and transparent. They showed excellent adhesion, water resistance and durability. They were insoluble in organic solvents and dilute alkalies and acids. Steel plates coated with a film of this material (.0011 in. thick) showed no corrosion after four months' immersion in water or brine. The solutions of the heat treated material were very stable, and a 50% solution in toluene showed no precipitation up to 4 months of standing.

Example 7

A solution of sodium polysulphide having a composition $Na_2S_3$ was prepared by heating 732 parts by weight of sodium sulfide ($Na_2S\cdot 9.2H_2O$), 192 parts of sulphur and 750 parts of water. This solution was cooled and added slowly, during 2.25 hours, to a mixture, maintained at 0° C. to —5° C., and vigorously stirred, composed of 435 parts of divinylacetylene and 665 parts of concentrated hydrochloric acid. The mixture was stirred an additional 15 minutes and then the temperature was raised to 20° C. and stirring continued for 30 minutes.

The layer containing the polysulphide addition product in divinylacetylene solution was separated, washed and dried. The divinylacetylene was distilled from a small portion of this solution (10 parts) and films prepared from a xylene solution of the polysulphide addition product. The films dried slowly (tack free) in 18 hours and resembled similarly prepared films of the preceding examples.

To the remaining 545 parts of the above divinylacetylene solution of the product 335 parts of xylene were added and the mixture was heated for 2.5 hours at 78–80° C. The divinylacetylene was distilled off leaving a 50% solution of the polysulphide product in xylene. This solution was exceedingly stable. Films prepared from it dried (tack free) in 5 hours. An additional heating of the 50% xylene solution for 3.5 hours at 75–80° C. gave films which dried in three hours and were smooth, transparent, glossy, insoluble in organic solvents and exceedingly resistant to acids and alkalies. In addition the films had but a slight odor. The xylene solutions were very stable. The 50% solution gelled at the end of three months and more dilute solutions did not gel in six months.

This invention has thus far been described with reference only to divinylacetylene but it is to be understood that it is not to be so limited and that it may be applied to a wide range of highly unsaturated compounds. Divinylacetylene or one of the other non-aromatic liquid polymers of acetylene, such as monovinylacetylene and its polymers, for example, acetylene tetramer, the isomer and polymers of divinylacetylene, for example, divinylacetylene dimer and polymerized divinylacetylene, from which the volatile material has been distilled off, is to be preferred as a starting material. Many other types of compounds may be used, however, as starting materials. These will include particularly highly unsaturated aliphatic hydrocarbons, that is, those containing more than one unsaturated linkage, such for example as those containing acetylenic linkages or more than one olefinic linkage. These hydrocarbons may also contain substituted groups, as for example, ester groups, ether groups, or aldehyde groups and some ketone groups. These esters will include particularly those where an unsaturated bond is conjugated with a carbonyl group, for example, such as acrylic, methacrylic, cinnamic, propiolic, etc. Hydrocarbons in which one of the hydrogens has been replaced by a halogen may also be used. Thus, by way of illustration, the following reactions have been carried out.

Example 8

Monovinylacetylene was mixed with hydrochloric acid and then slowly treated with sodium polysulphide to form a viscous liquid product which was soluble in carbon bisulphide, or which on standing was converted to a soft insoluble resin. Chloro-2-butadiene-1,3 was also reacted with hydrogen polysulphide to form a liquid product having the composition $$(CH_3-CCl=CH-CH_2)_2S_3$$

Methyl-methacrylate has likewise been found to react readily with hydrogen polysulphide.

It will be apparent from the examples that addition of the hydrogen polysulphide may be effected by several methods; (1) the isolated polysulphide may be reacted directly with the acetylene polymer; (2) the reaction may take place in the presence of an organic solvent or diluent; (3) the reaction may be brought about by adding an alkali metal polysulphide to a mixture of the acetylene polymer with hydrochloric acid. Method 2 is generally preferred to Method 1, as the use of solvents or diluents permits better control of the reaction. Suitable organic solvents or diluents include benzene, xylene, toluene and chloroform. Method 3 is preferred over the other methods whenever the presence of acids is not objectionable. By this method the hydrogen polysulphide is generated as required and the necessity of isolating the extremely unstable hydrogen polysulphide, as such, is eliminated. This method further permits of better control, since a given polysulphide is formed and used before it has time to decompose. For example, if it is desired to prepare an addition product from $H_2S_5$, this compound may be formed and reacted by Method 3 to give a large amount of an $H_2S_5$ addition product, whereas if an attempt were made to isolate $H_2S_5$ and then add it as such to the reaction mixture, the resulting products would be addition products not only of $H_2S_5$ but also of $H_2S_3$ for example, in sizable amounts.

The value of $x$ in $H_2S_x$ exerts a profound influence upon the addition product. The operable values for $x$ vary from a lower limit slightly greater than 1 to an upper limit determined only by the mount of sulphur which may be dissolved in the intermediate solution of sodium polysulphide. In general, it is desirable to keep the value for $x$ quite low, for, as the amount of sulphur increases, the addition products become less soluble and less desirable as film formers. Materials containing a large quantity of sulphur are softer and dry more slowly. In addition, their solutions are not so stable and precipitate on standing to form gel-like polymers. It is important that the value for $x$ in $H_2S_x$ be greater than 1, as no reaction takes place with hydrogen sulphide itself.

The ratio of hydrogen polysulphide to the hydrocarbon is also important in determining the character of the addition product. An excess of hydrogen polysulphide gives more complete reaction with the unsaturated linkages with the result that the addition products are more insoluble. Therefore, in general it is desirable to use an excess of the hydrocarbon, e. g., monovinylacetylene, divinylacetylene, etc., so that the product may have the desired solubility. Substantially the same change in properties, i. e., for example, increased insolubility occurs as the ratio of polysulphide to hydrocarbon increases as occurs when the value of $x$ in $H_2S_x$ increases.

Temperature is an important factor in the success of the reactions. We prefer to operate at low temperatures, say from $-10°$ C. to $+10°$ C., but do not so limit the invention, as temperatures as high as $30°$ C. are operable, especially when dilute solutions of the hydrocarbon are used. The temperature range is limited on the lower side by the cooling facilities only. The formation of objectionable by-products may be reduced considerably by efficient stirring and the use of low temperatures. This is especially true as the value for $x$ in $H_2S_x$ increases.

The reaction times given in the various examples are not important and are not critical. Wide variations in the reaction time are possible. It is, in general, controlled by the temperature, particularly by the ability of the operator to maintain the temperature at the desired point.

As illustrated in Examples 6 and 7, the stability of the addition products toward gelling in solution may be greatly increased by heating either in the presence of the excess unreacted unsaturated reactant or in the presence of an inert diluent such as toluene or xylene or in the presence of both diluent and reactant. For this purpose the mixtures may be heated to 70 to $90°$ C. for periods as long as 12 hours. This heat treatment makes the addition products more useful as film-formers, less odorous, and also reduces the tendency of the product to precipitate or gel in solution. The optimum period of heating may be determined by removing samples from time to time during the heating operation, to determine whether the "end-point" has been reached. The "end-point" has been reached when a small sample of the solution which has been allowed to evaporate on a glass plate, dries nearly dust free in a given time. A suitable drying rate is obtained for many purposes, when the film becomes nearly dust free in 20 to 30 minutes.

Many of the reaction products of divinylacetylene with hydrogen polysulphide closely resemble the synthetic drying oil prepared by heating divinylacetylene and described in U. S. Patent 1,812,544. Like this latter product they may serve as a vehicle for pigments in the production of lacquers and paints. They have the advantages of low viscosity, high build, and rapid drying to exceedingly hard films which have extraordinary resistance to corrosive agents and organic solvents. However, the new products of the present invention have the additional advantages of increased flexibility and adhesion and greatly reduced inflammability.

By the processes of this invention many new and valuable products have been obtained. Many of the addition products still contain unsaturation after reaction with hydrogen polysulphide, and may serve as starting-points for further reactions to produce additional new products. The products of this invention will be useful as coating and impregnating compositions where resistance to oils, solvents, dilute acids and alkalies is desired. Additional uses will be as lacquer vehicles, and for marine and other paints where the painted surface will be submerged. The excellent adhesive qualities of the materials of this invention make them suitable for use in combination with under-coats where the exclusion of water, solvents, etc., is necessary.

As many apparent and widely different embodiments of this invention may be made without departing from the spirit and scope thereof, it is to be understood that the invention is not to be limited except as defined in the appended claims.

I claim:

1. A hydrogen polysulphide addition product of a non-aromatic liquid polymer of acetylene.

2. A hydrogen polysulphide addition product of divinylacetylene.

3. A product prepared by reacting hydrogen polysulphide with a non-aromatic liquid polymer of acetylene at a temperature of —10 to +10° C.

4. A product prepared by reacting hydrogen polysulphide with divinylacetylene at a temperature of —10 to +10° C.

5. A product prepared by heating a hydrogen polysulphide addition product of a non-aromatic liquid polymer of acetylene to 70–90° C. in the presence of a solvent for the addition product.

6. A product prepared by heating a hydrogen polysulphide addition product of divinylacetylene to 70–90° C. in the presence of a solvent for the addition product.

7. The product of claim 6 characterized in that the solvent is divinylacetylene.

8. The product of claim 6 characterized in that the solvent is an inert solvent.

9. The process which comprises reacting hydrogen polysulphide with a non-aromatic liquid polymer of acetylene.

10. The process which comprises reacting hydrogen polysulphide with divinylacetylene.

11. The process of claim 9 characterized in that the reaction is carried out at a temperature of —10 to +10° C.

12. The process of claim 10 characterized in that the reaction is carried out at a temperature of —10 to +10° C.

13. The process which comprises adding sodium polysulphide to a mixture of hydrochloric acid and divinylacetylene at a temperature of —10 to +10° C.

14. The process which comprises adding sodium polysulphide to a mixture of hydrochloric acid and divinylacetylene at a temperature of —10 to +10° C. and thereafter removing the resulting hydrogen polysulphide addition product of divinylacetylene from the reaction mixture.

15. The process which comprises reacting hydrogen polysulphide and a non-aromatic liquid polymer of acetylene, removing the resulting non-aqueous layer consisting of addition product dissolved in the unreacted liquid polymer of acetylene and thereafter heating the addition product-reactant solution to 70–90° C.

16. The process of claim 15 characterized in that an inert solvent is added to the addition product-reactant solution prior to the heat treatment.

17. The process which comprises reacting hydrogen polysulphide and divinylacetylene at a temperature of —10 to +10° C., thereafter removing the non-aqueous layer from the reaction mass and heating said non-aqueous layer to 70–90° C.

18. The process which comprises reacting hydrogen polysulphide and divinylacetylene at a temperature of —10 to +10° C., thereafter separating the addition product from the reaction mass, mixing said product with an inert solvent for the addition product and heating the resulting solution to 70–90° C.

19. The process of claim 17 characterized in that 200% of an inert solvent for the addition product, based on the weight of the addition product, is added to the non-aqueous layer prior to the heat treatment.

20. The process which comprises reacting a compound having the approximate composition $H_2S_2$ with divinylacetylene at a temperature of 0 to —5° C., separating the non-aqueous layer from the reaction mass and thereafter heating the said non-aqueous layer for about 3.5 hours at 76–78° C.

21. A hydrogen polysulphide addition product of an aliphatic hydrocarbon containing more than one unsaturated bond.

22. The process which comprises reacting hydrogen polysulphide with an aliphatic hydrocarbon containing more than one unsaturated bond.

23. The process which comprises reacting hydrogen polysulphide with a compound of the general formula X—R—Y in which R is an aliphatic hydrocarbon group containing more than one unsaturated bond, X is hydrocarbon or hydrogen and Y is a member of the group consisting of hydrogen, halogen, ester, ether, aldehyde and ketone groups.

24. The process which comprises adding sodium polysulphide to a mixture of hydrochloric acid and an aliphatic hydrocarbon containing more than one unsaturated bond, then reacting.

25. The process which comprises adding sodium polysulphide to a mixture of hydrochloric acid and a compound of the general formula X—R—Y in which R is an aliphatic hydrocarbon group containing more than one unsaturated bond, X is hydrocarbon or hydrogen and Y is a member of the group consisting of hydrogen, halogen, ester, ether, aldehyde and ketone groups, then reacting.

WALLACE H. CAROTHERS.

CERTIFICATE OF CORRECTION.

Patent No. 2,061,018. November 17, 193

WALLACE H. CAROTHERS.

It is hereby certified that error appears in the printed specification of the above numbered patent requiring correction as follows: Page 2, first column, line 6, for the word "sulphide" read sulphur; and that the said Letters Patent should be read with this correction therein that the same may conform to the record of the case in the Patent Office.

Signed and sealed this 16th day of March, A. D. 1937.

(Seal)

Henry Van Arsdale
Acting Commissioner of Patents.